(12) United States Patent
Kako

(10) Patent No.: US 11,059,241 B2
(45) Date of Patent: Jul. 13, 2021

(54) SYSTEM AND A METHOD FOR PRODUCING A COMPONENT FROM A FIBRE COMPOSITE MATERIAL

(71) Applicant: Airbus Operations GmbH, Hamburg (DE)

(72) Inventor: Jan-Christoph Kako, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 2 days.

(21) Appl. No.: 16/581,871

(22) Filed: Sep. 25, 2019

(65) Prior Publication Data

US 2020/0114592 A1 Apr. 16, 2020

(30) Foreign Application Priority Data

Oct. 11, 2018 (DE) ...................... 10 2018 125 133.5

(51) Int. Cl.
*B29C 70/38* (2006.01)
*B29K 105/08* (2006.01)

(52) U.S. Cl.
CPC .... *B29C 70/388* (2013.01); *B29K 2105/0872* (2013.01)

(58) Field of Classification Search
CPC ..... B29C 70/38; B29C 70/382; B29C 70/384; B29C 70/386; B29C 70/388; B29K 2105/0872
See application file for complete search history.

(56) References Cited

U.S. PATENT DOCUMENTS

| 10,434,727 | B2 | 10/2019 | Engel et al. | |
|---|---|---|---|---|
| 2006/0260751 | A1* | 11/2006 | Lauder | B29C 70/388 156/382 |
| 2013/0056575 | A1* | 3/2013 | Grimshaw | B29C 70/38 242/559 |

(Continued)

FOREIGN PATENT DOCUMENTS

| DE | 694 29 118 T2 | 3/2002 |
|---|---|---|
| DE | 10 2010 015 027 A1 | 10/2011 |

(Continued)

OTHER PUBLICATIONS

Translation of WO 2018018802 A1, Feb. 2018, Wang Dong (Year: 2018).*

(Continued)

*Primary Examiner* — George R Koch
(74) *Attorney, Agent, or Firm* — Lerner, David, Littenberg, Krumholz & Mentlik, LLP

(57) ABSTRACT

A system for producing a component from a fibre composite material includes a moulding tool, a control unit and a plurality of mutually independent material application units, each of which includes a material store for providing fibres, a material delivery apparatus for delivering fibres from the material store and a drive device, and is configured, with the aid of the drive device, to follow a predetermined path on the moulding tool, while delivering fibres as required. The control unit controls the material application units by specifying a plurality of individual paths, so that they move autonomously along the paths. The control may, in particular, be carried out by optical projection onto the moulding tool.

14 Claims, 4 Drawing Sheets

(56) References Cited

U.S. PATENT DOCUMENTS

| | | |
|---|---|---|
| 2016/0023450 A1 | 1/2016 | Schulte et al. |
| 2017/0015070 A1* | 1/2017 | Bauer ................. G01M 5/0033 |
| 2017/0182759 A1* | 6/2017 | Crothers ................. B32B 37/14 |

FOREIGN PATENT DOCUMENTS

| | | | |
|---|---|---|---|
| DE | 10 2014 214 570 A1 | 1/2016 | |
| DE | 10 2015 100 102 A1 | 7/2016 | |
| EP | 0 431 916 A2 | 6/1991 | |
| EP | 2 808 158 A1 | 12/2014 | |
| EP | 3 173 218 A1 | 5/2017 | |
| WO | 9619335 A1 | 6/1996 | |
| WO | 2017143063 A1 | 8/2017 | |
| WO | 2018018802 A1 | 2/2018 | |
| WO | WO-2018018802 A1 * | 2/2018 | ............. B29C 70/30 |

OTHER PUBLICATIONS

Extended European Search Report for Application No. 19185697 dated Jan. 16, 2020, 2 pages.

* cited by examiner

SYSTEM AND A METHOD FOR PRODUCING A COMPONENT FROM A FIBRE COMPOSITE MATERIAL

FIELD OF THE INVENTION

The invention relates to a system and a method for producing a component from a fibre composite material.

BACKGROUND OF THE INVENTION

In order to produce components from a fibre composite material, many different techniques are known, which are selected and used according to the size of the component to be produced, according to the fibre material and according to the matrix material. For example, methods are known in which fibres are laid manually onto a moulding tool in the form of tapes or fabrics with preimpregnation. In this way, layer constructs having a plurality of layers of the fibre material may be produced, in which case the individual layers may have different orientations of the fibres. The orientations are, in particular, selected according to the loading.

Automated apparatuses which can carry such a process are already known. For instance, apparatuses for the automatic laying of fibre tapes (ATL, "Automatic Tape Laying") and for the automatic laying of fibres (AFP, "Automatic Fiber Placement") are known, with which large-format components may be produced on very large tool surfaces. When using such apparatuses, the size of the components to be produced cannot be increased arbitrarily. In other to obtain sufficient accuracy, a particularly robust design of guide apparatuses is required, so that the accuracy does not decrease at all even with relatively large movement distances. The larger the component to be produced, the greater the mechanical outlay for maintaining this accuracy. From economic considerations, the component sizes which can be realistically produced with such apparatuses are limited.

BRIEF SUMMARY OF THE INVENTION

Aspects of the invention may propose a system for producing components from a fibre composite material, which can be scaled as easily as possible and allows processing of sizeable components without fundamental modification.

A system for producing a component from a fibre composite material is proposed, the system comprising a moulding tool, a control unit and a plurality of mutually independent material application units, wherein each material application unit comprises a material store for providing fibres, a material delivery apparatus for delivering fibres from the material store and a drive device, and is configured, with the aid of the drive device, in order to follow a predetermined path on the moulding tool, while delivering fibres as required, wherein the control unit is configured to control the material application units by specifying a plurality of individual paths, and wherein the control unit is configured in order to produce at least one layer of fibre plies on the moulding tool by controlling the material application units.

The moulding tool is an apparatus which comprises a bearing surface on which the desired component can be laid layerwise, i.e. in the form of fibre plies. After subsequent curing, the component is obtained. The bearing surface consequently has a structure, or shape, which preferably corresponds to an outer surface of the component to be produced. The moulding tool consequently extends at least over the entire area of the component to be produced.

The material application units are individual apparatuses, of which there are a plurality, which can be moved independently over the moulding tool. This means that the material application units are configured in order to move the moulding tool along predetermined paths. In particular, they are not dependent on other external apparatuses for carrying out their movement. It is, however, conceivable for the control unit to be configured in order to specify a position reference with respect to which the material application units are oriented.

By way of the material store, each material application unit is configured in order to lay fibre material on the moulding tool during the movement. If there is not yet any material on the moulding tool at the start of a process, a material application unit may consequently move along predetermined paths on a free surface of the moulding tool, in which case material may be delivered during the movement process. It is not absolutely necessary for each material application unit to constantly deliver material during its movement. Rather, the functions of movement and of delivery are to be regarded as mutually independent, since a material application unit may, for example, also be intended to be able to move from one particular surface section to another surface section without continuously delivering material between the two surface sections.

The control unit is configured in order to control the material application units. This means that the control unit is configured, on the basis of a predetermined structure or topology of a planned component, in order to establish individual paths which must be executed by the material application units in order to be able to produce the desired component. In particular, the control unit is configured in order to specify a logical sequence of paths to be executed, which may be differently oriented, so that a layer construct having differently oriented fibres can be formed. The control unit may be configured in order to control a plurality of material application units in parallel with one another, so that a plurality of material application units, which in one particular case may include all the material application units, can also be moved on the moulding tool.

The system according to an embodiment of the invention consequently proposes a kind of fleet of relatively small material application units, which can be moved mutually independently on the moulding tool, and in this case follow paths which are specified by the control unit, while delivering fibre material. A size of the component to be produced can consequently be scaled very easily by adapting the moulding tool to the desired size and shape of the component and using more or fewer material application units, as required. Elaborate structural stiffening, for example of a guide frame on which a material application apparatus is mounted, is not required when the size of the component to be produced increases. Rather, a consistent precision is to be expected when the control unit of each material application unit is used as a position reference or can provide a position reference.

In one advantageous embodiment, the control unit comprises an optical projection unit, wherein the projection unit is configured in order to project predetermined paths onto the moulding tool, and wherein the material application units are configured in order to respectively follow a predetermined path. The required electronic equipment of a material application unit may for this reason be greatly simplified. A material application unit may, in particular, be equipped with optical sensors in order to follow a predetermined path which is projected onto the moulding tool. Elaborate electronics for navigation of individual material application units on the moulding tool can be avoided. The control unit must merely be equipped in order to specify spatially exactly defined paths, which the material application units must follow, on the moulding tool. Scaling is also facilitated by this, since a consistent accuracy can be ensured. It is furthermore conceivable, instead of just one projection unit, also to specify a plurality of projection units which are all connected to the control unit and are spatially distributed along the moulding tool. By way of a preferably one-off calibration of the projection units with respect to one another and with respect to the moulding tool, a linear expansion of the size of the component to be produced may be achieved. The optical projection unit represents a spatially fixed position reference, on the basis of which the predetermined paths are projected onto the moulding tool.

In one likewise advantageous embodiment, the control unit is configured in order to restrict a projection of the predetermined paths respectively to a limited extent around a material application unit associated therewith. In this way, the line lengths projected by the projection unit can be limited, which increases the efficiency of the projection unit.

In one preferred embodiment, the at least one projection unit is configured in order to project a predetermined path onto the moulding tool by means of a laser beam. The use of a laser beam leads to good visibility of a projection, as well as a sufficient accuracy because of the positive properties of the laser beam.

The material application units may comprise an electrical drive device, a battery which can be coupled thereto, and a path control unit, the path control unit being configured in order to control the electrical drive device so that it follows a predetermined path. The electrical drive device may comprise at least one electric motor. The drive device could provide a differential drive which is suitable for carrying out curved movements. It may be recommendable to couple two drive wheels respectively to one electric motor, so that curved movements can be carried out when required by individual control of the two electric motors. It would, however, also be conceivable to provide one or two steerable wheels, so that just one drive wheel or two drive wheels connected by means of an axle is/are sufficient for coupling to a single electric motor. The battery may be based on one of several different technologies, and should as far as possible be encapsulated securely enough to avoid damage to a fibre ply if this battery has a defect. The weight of the individual material application units is not of great importance, so that batteries with a high energy density do not need to be used.

Preferably, the material application units respectively comprise at least one optical detection device, which is respectively coupled to the associated path control unit, the path control unit being configured in order to follow an optical projection, detected by the detection device, of a path. Different variants may be envisaged for a detection device. Simple path guiding logics are known, which require for instance merely two photodiodes in order to follow the predetermined path. In order to achieve a higher accuracy, it is conceivable to use a camera, and in particular a high-resolution camera, so that even very small deviations of a movement path from a predetermined path can be avoided. The optical projection of a path could, for instance, be restricted to a thin line on which the material application unit is centrally located. The drive device is controlled in such a way that the material application unit always remains centrally on an arbitrarily shaped path.

The individual material application units could furthermore be equipped with a collision avoidance device. The latter is configured in order to avoid a collision between a plurality of material application units on the moulding tool. This could, for example, be achieved by equipping each material application unit with distance sensors. These could, for example, be based on an ultrasound measurement. On the other hand, an already existing optical detection device, in particular a camera, could be used in order to detect other material application units before a potential collision. This could be improved by providing all the material application units with an optically visible identifier which can be detected easily by a camera.

Each material application unit could be equipped with a first optical detection device. This could for example be arranged at the front, i.e. in the movement direction. The predetermined path is thereby detected directly, and is followed.

Furthermore, each material application unit could comprise a second optical detection device which is arranged at the rear, i.e. counter to the movement direction. An even higher precision of the path compliance may thereby be achieved. Furthermore, with this second optical detection device an optical visual inspection of the applied material could be carried out. This can be assisted by the projected path.

Each material application unit could furthermore comprise a position correction device which is coupled to the material delivery apparatus. Depending on the required tolerance, this position correction device may correct the at least one material delivery apparatus in respect of its position, in particular a lateral position, relative to the rest of the material application unit. The precision of the path guiding may thereby be increased.

In one advantageous embodiment, the control unit is configured in order to project a plurality of optical symbols onto the moulding tool, wherein the path control unit of the material application units is respectively configured in order to recognize optical symbols detected by the detection device and to carry out control instructions assigned thereto. In this way, all the material application units can very easily be assigned a control construction, which may furthermore be made dependent on progress of the path guiding. The material application units could here for example respectively comprise a store with a predetermined group of control instructions which are respectively assigned to a clearly identifiable symbol. Each path which is projected onto the moulding tool by the projection unit could to this end be provided with at least one additional symbol. For example, the control instructions relate to stopping the material application unit at the end of a particular path, starting a material delivery, ending a material delivery, temporarily pausing for the passing of other material application units, and many other control instructions. By way of the optical projection of control instructions, users or operators may furthermore very intuitively establish whether the system is functioning correctly. By virtue of the optical projection of the control instructions, there is furthermore no data traffic in a wireless network. Another advantage is that the material application units can be replaced easily, since identification of them in a wireless network is not necessary and they merely need to follow a particular path.

Preferably, the material application units respectively comprise a first communication device, wherein the control unit comprises a second communication device, and wherein the material application units are configured in order to send status data to the control unit via the first communication device and the second communication device. This offers the possibility of transmitting signals from the material application units to the control unit, when this is necessary. Each material application unit could consequently send the control unit information about the fact that the capacity of a battery is almost drained, or that the material store needs to be replaced. Particularly in combination with the purely optical transmission of control instructions, a data channel remains free in order to transmit substantial data.

The control unit is preferably configured in order to send control instructions to the material application units via the first communication device and the second communication device. It is conceivable that the control unit preferably sends out only system-wide control instructions. This preferably takes place to all the material application units, for instance in the form of a broadcast. System-wide control instructions may, for instance, involve suspension of the movement of all the material application units.

In one preferred embodiment, the material store comprises at least one spool for delivering fibre material. The spool may be provided with a predetermined amount of fibre material. This could be done in the form of a preimpregnated endless tape. It is conceivable that, in this case, the material delivery apparatus also comprises a cutting apparatus in order to cut the fibre material at the end of a predetermined path. It is, however, also conceivable for the spool to be provided with fibre material which is produced in the form of individual sections with predetermined lengths. To this end, the control unit is preferably configured in order to plan the paths to be predetermined for the corresponding material application unit in such a way that the sections located on the material store are laid successively.

In another preferred embodiment, the material store comprises a first spool and a second spool, wherein the first spool comprises a material carrier tape having a fibre material arranged thereon, wherein the material carrier tape can be delivered from the first spool and received by the second spool, and wherein the material carrier tape runs over a deviating apparatus as the material delivery apparatus and can be brought into contact with the moulding tool or a fibre ply located thereon. The material carrier tape is consequently moved forward from the first spool to the second spool in a similar way as in an audio cassette. The material delivery apparatus is in this case realized as a deviating apparatus between the two spools, in which the material carrier tape experiences a large deviation, in particular by more than 90°. In this way, the fibre material which is affixed to the material carrier tape is released in order to be laid. In order to deliver the material, the deviating apparatus is to be correspondingly pressed onto the moulding tool, or the fibre ply located thereon. In order to suspend or end a material delivery, the deviating apparatus, or the material delivery apparatus, is removed from the moulding tool or the fibre ply located thereon by lifting.

The first spool could be driven by an electric motor. The latter could be located directly in the material store or belong to a section of the material application unit located outside. The second spool could be driven by an independent electric motor or by means of corresponding gearing. It is in this case necessary to ensure that a sufficient torque for winding the material carrier tape is achieved. A ratchet mechanism could prevent rotation from taking place in an opposite direction.

The material store may preferably be equipped with at least two sensors. A first sensor is to this end configured in order to measure a material tension immediately before the deviating apparatus. A second sensor is preferably configured in order to establish the start of the fibre material affixed to the material carrier tape shortly before the deviating apparatus. This could be achieved by a photoelectric barrier, a camera or a photodiode.

A third sensor would furthermore be conceivable, which measures the tension of the material carrier tape after the deviating apparatus and controls an electric motor which is connected to the second spool.

For the material delivery, it is particularly advantageous for the material carrier tape to be moved in a controlled way between the two spools in order to minimize a tension on the fibre material to be delivered. In particular, the movement of the material carrier tape is to be adapted to the movement of the material application unit on the moulding tool or the fibre ply located thereon. The fibre material should as far as possible be laid without tension.

After material delivery has been carried out, the at least one material store is lifted from the moulding tool or the fibre ply located thereon. After this, the material carrier tape is preferably moved forward until a start of a further material section is present at the deviating apparatus. The material delivery apparatus is therefore adapted, after being lowered again onto the moulding tool or a fibre ply located thereon, to lay a subsequent material track, or the next material section of the fibre material.

The material store could be arranged replaceably on the material application unit, wherein the control unit is coupled to a material handling unit, which is configured in order to replace the material store of at least one of the material application units when required. A material application unit could, for instance, comprise a material store which has a predetermined amount of a fibre material in precut sections. If this material store is exhausted after a certain number of laying processes, the material application unit may move to the material handling unit in order to be provided with a filled material store there. At this point, it should be pointed out that the material delivery apparatus may be connected to the material store, so that the material delivery apparatus is also replaced when the material store is replaced.

The material store may comprise a data memory which is coupled to a regulating unit of the material application unit. The data memory may be used for various purposes. On the one hand, data of a mission sequence may be stored in it. The mission sequence may, for example, comprise a series of information items relating to branchings or other direction changes. The workload of the control unit can thereby be reduced, and it would need to project less position-dependent data which lead to a direction change of the material application units. On the other hand, data recorded during the laying, optionally with partial or full image acquisition, may be stored on the data memory for subsequent evaluation and traceability, and subsequently called up and consolidated in the control unit or a device connected thereto.

Preferably, the material handling unit is configured in order to fill a material store with fibre material. Both filling with fibre material as an endless tape and filling with precut sections may be envisaged. The control unit may in this context furthermore be configured in order to plan a sequence of the laying process so that the material application units are constantly supplied with a correct number of precut sections which are missing in an intended section with the paths to be executed by the material application unit in question.

In the same way, a battery handling unit may be produced, to which a material application unit may be moved to carry out replacement of a battery.

Preferably, the moulding tool comprises a processing surface and an edge surface surrounding the processing surface, wherein the edge surface is dimensioned in such a way that a plurality of material application units can stand next to one another on the edge surface and passing of further material application units is possible only on the edge surface. Since not all the material application units lay material continuously, it may be necessary to park a certain number of material application units on the edge surface. It is furthermore sometimes necessary to calculate that material application units move to and fro between two sections of the moulding tool, so that they may also move past between the processing surface and the parked material application units. The edge surface in particular surrounds the processing surface fully, i.e. along a continuous line.

Lastly, the system could comprise a correcting device, which is configured in order to remove a defective material track from the moulding tool or a fibre ply located thereon. The control unit could, for instance, establish by verification by means of a second optical detection device that a material track does not exactly follow a predetermined path. The correcting device could then remove this affixed material track again by the material application unit moving in the opposite direction and thereby removing the material track. The correcting device may, for instance, comprise a wedge which is inserted between the moulding tool and the material track in question thereby exerting a separating force. The wedge could be heated and/or vibrate by ultrasound. An additional gripper could assist the removal. It would furthermore be conceivable to locally influence the holding force between the material track and the moulding tool by targeted cooling.

If the material application units comprise a second optical detection device, it is particularly advantageous for the material application units additionally to comprise an image evaluation unit. This could be configured in order to check the state of the laid fibre material which enters the detection region of the second optical detection device. In this case, a position of a laid material track can be determined relative to a predetermined path, which forms the reference. Control, required for the correction, of the correcting device may therefore be initiated if an intolerable deviation is established. The tolerable deviation could be specified in the form of a dimensional tolerance. The dimensional tolerance could define a maximum deviation of a laid track from a predetermined path as an absolute measure, for example 0.1 mm or another value.

BRIEF DESCRIPTION OF THE DRAWINGS

Further features, advantages and application possibilities of the present invention may be found in the following description of the exemplary embodiments and the figures. In this case, all described and/or pictorially represented features per se and in any combination are also the subject matter of the invention, independently of their configuration in the individual claims or back references thereof. In the figures, identical reference signs stand for objects which are the same or similar.

DETAILED DESCRIPTION

Figure 1:
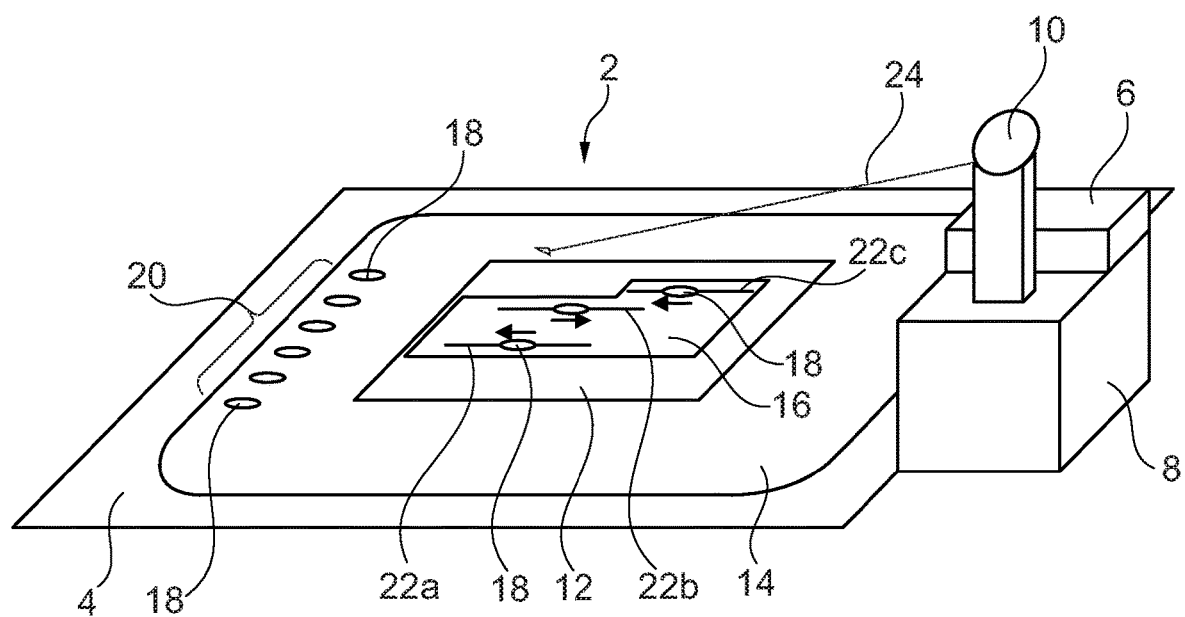
FIG. 1 shows a schematic representation of a system according to an embodiment of the invention.

FIG. 1 shows a very schematic representation of a system 2 according to an embodiment of the invention for producing a component from a fibre composite material. The system 2 contains a moulding tool 4, a control unit 6 and a material handling unit 8. The control unit 6 comprises, for example, a projection unit 10. The moulding tool 4 comprises a processing surface 12 and an edge surface 14 surrounding the processing surface.

By way of example, a first fibre ply 16 is represented on the processing surface 12. The system 2 furthermore comprises a plurality of mutually independent material application units 18, which are configured in order to deliver material from a material store on the processing surface 12 in order to produce a fibre ply. The individual material application units are represented in different positions. A first group 20 of material application units 18 is, for instance, arranged on the edge surface 14 in the drawing plane in a left-hand region and these are not currently carrying out a material application task.

The edge surface 14 is dimensioned in such a way that individual material application units 18 on the edge surface 14 may also pass the parked material application units 18 of the first group 20 or of another group in order to reach the processing surface 12. All the parking spaces outside the processing surface 12 are therefore flexibly reachable and usable.

On the processing surface 12, by way of example, there are three material application units 18, which are respectively following a predetermined path 22a, 22b, 22c. These paths are projected by the projection unit 10 onto the moulding tool 4, and the material application units 18 are configured in order to follow them autonomously. In further subsequent figures, it is additionally represented that control instructions may also be communicated to the material application units 18 by projection onto the moulding tool 4.

The aim of the system 2 is to project predetermined paths and control instructions on the moulding tool 4 with the aid of the projection unit 10, for example by means of a laser beam 24, in order to control material application units 18 purely optically so that they move autonomously on the moulding tool 4 and in doing so can deliver material according to the specification of the control unit 6. The size of the moulding tool 4, or of the processing surface 12, may be increased arbitrarily by this technique, without the need for particularly elaborate, mechanically rigid guide devices which can produce longer movement distances and in this case have a consistent precision. An increase in size of the processing surface 12 in the system 2 according to the invention is not associated with a reduction in the precision, since the latter depends only on the projection unit 10. It would be conceivable also to use a plurality of projection units 10, which are distributed outside the moulding tool 4 and in this case can provide an even larger surface with corresponding projections.

The individual material application units 18 are respectively equipped with a replaceable material store (not shown). Once this is empty because of application of the material, the material application unit 18 in question may move to the material handling unit 8 in order to carry out a replacement of the material store there.

Figure 2:
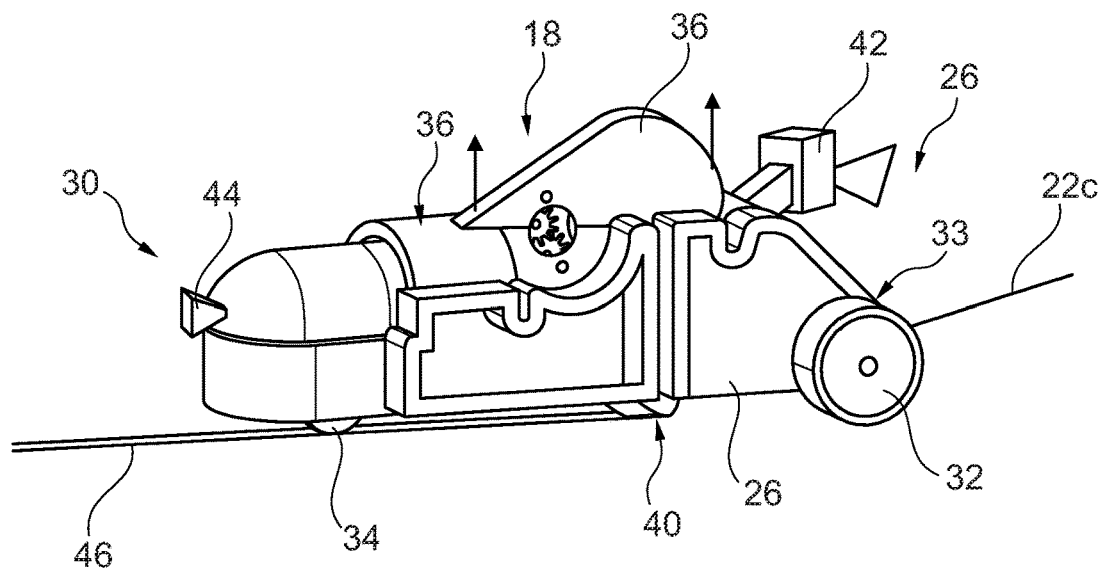
FIG. 2 shows an exemplary representation of a material application unit in a three-dimensional view.

FIG. 2 shows an exemplary embodiment of a material application unit 18. This, of course, is merely one of many conceivable embodiments. The material application unit 18 comprises a chassis 26, which comprises a front side 28 and a rear side 30. Two front wheels 32 are provided on the front side 28, which are differentially driveable and, together with one or two electric motors (not shown), form a drive device 33. On the rear side 30, on the other hand, a single rear wheel 34 is positioned. By way of the differential driving of the front wheels 32, the material application unit 18 can navigate curved routes and therefore, for example, follows the path 22*c*.

The material application unit 18 comprises a holder 36, in which a replaceable material store 38 is arranged. The latter furthermore comprises a material delivery apparatus in the form of a deviating apparatus 40, which is configured in order to deliver material. As can be seen here, the material store 38 extends fully through the material application unit 18, so that the material delivery apparatus 40 can be placed on the moulding tool 4 or a fibre ply located thereon. When the material delivery apparatus 40 touches the moulding tool 4 or a fibre ply located thereon, fibre material can be delivered by it. By raising the material store 38 and therefore the material delivery apparatus 40, the material delivery can be interrupted, which is indicated here by vertical arrows on either side of the material store 38.

Arranged on the front side 28, there is furthermore a first optical detection device 42, which is configured in order to optically detect the path 22*c*. Arranged in the material application unit 18, there is furthermore a control unit (not shown here), which is configured in order to differentially control the front wheels 32 in order to follow the path 22*c*. To this end, the control unit is coupled to the first optical detection device 42 and configured in order to detect a course of the path 22*c* and, from the course of the path 22*c*, to plan a steering or turning movement required in order to follow the path 22*c*.

By way of example, a second optical detection device 44 is arranged on the rear side 30, which is configured in order to detect the course of a laid material track 46. The second optical detection device 44 may likewise be coupled to the control unit and, for instance, be used in order to verify path compliance.

The material application unit 18 may furthermore comprise a battery or an accumulator, which is coupled to the electrical components. This is not shown here.

Figure 3:
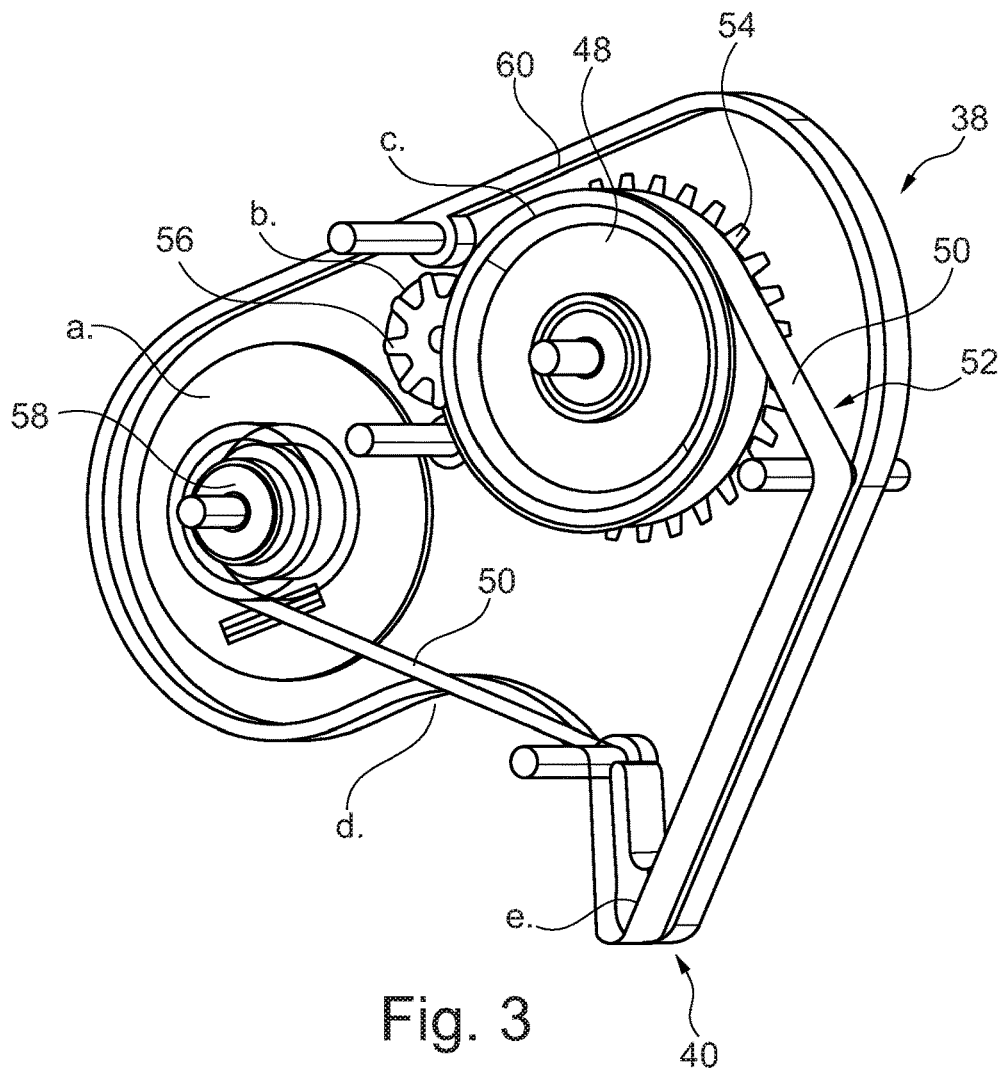
FIG. 3 shows a partial section of a material store.

FIG. 3 shows a partial sectional representation of the replaceable material store 38. Arranged therein, there is a first spool 48, which comprises a material carrier tape 50 with a fibre material 52 arranged thereon. The first spool 48 comprises a first cog wheel 54, which is coupled to a pinion 56. By driving the pinion 56, the first spool 48 can consequently be driven. The first spool 48 is configured in order to deliver fibre material 52 by unwinding the material carrier tape 50.

The material store 38 furthermore comprises a second spool 58, which can receive the material carrier tape 50. The second spool 58 may be driven by an electric motor (not represented here) which constantly exerts a slight pulling force on the material carrier tape 50. The material delivery apparatus 40 may be realized in the form of a pronounced local deviation through an angle of much more than 90°. In this way, the fibre material 52 can be separated from the material carrier tape 50. The fibre material 52 may be affixed to the material carrier tape 50 by a (weak) adhesive, particularly in the case of a thermoplastic matrix, or by a certain intrinsic tackiness, particularly when using prepregs. The fibre material is thus peeled off from the material carrier tape 50 by the deviation.

The material store 38 is encapsulated by a housing 60, and therefore resembles a cassette. This makes it possible for the material store 38 to be able to be replaced in the material handling unit 8. The material handling unit 8 may to this end have a plurality of filled material stores 38 and/or be configured in order to fill empty material stores 38 autonomously. This is expedient in particular when precut sections of the fibre material 52 are intended to be delivered.

Figure 4:
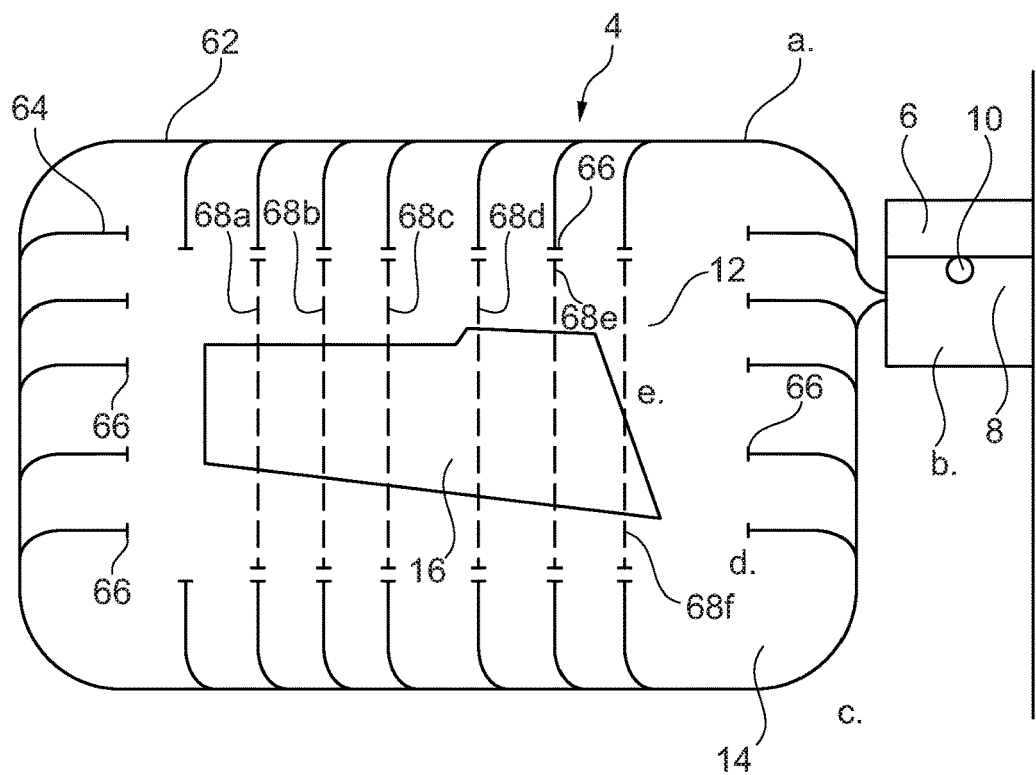
FIG. 4 shows a plan view of a holding tool 4 with predetermined paths projected thereon.

FIG. 4 shows a plan view of the moulding tool 4 with the processing surface 12 and the edge surface 14 and furthermore, with the aid of an example, demonstrates a pattern projected onto the moulding tool 4. By way of example, a static circumferential line 62 is shown, on which a plurality of branch lines 64 are arranged. These are to be understood as parking markings, where material application units 18 that are currently not being used may park.

In order to mark end positions, the branch lines 64 respectively comprise an end line 66. It is thereby symbolized to the material application units 18 that they should stop at this position. Path lines 68*a*, 68*b*, 68*c*, 68*d*, 68*e* and 68*f*, which by way of example extend parallel to one another, are furthermore provided on the processing surface 12. It is thereby signalled to the material application units 18 that they should follow this path 68*a* to 68*f*.

By way of example, at the intersections with the first ply 16 to be produced, a triangular symbol is respectively provided, which indicates the start or the end of a processing path. Possible symbols are shown by way of example in the subsequent FIG. 5. It is conceivable that a single projection unit 10 is configured in order to indicate all these lines. To this end, the control unit 6 may be configured in order to plan and subsequently specify an individual path for each individual material application unit 18, so that the material application unit 18 in question then follows this path.

Figure 5:
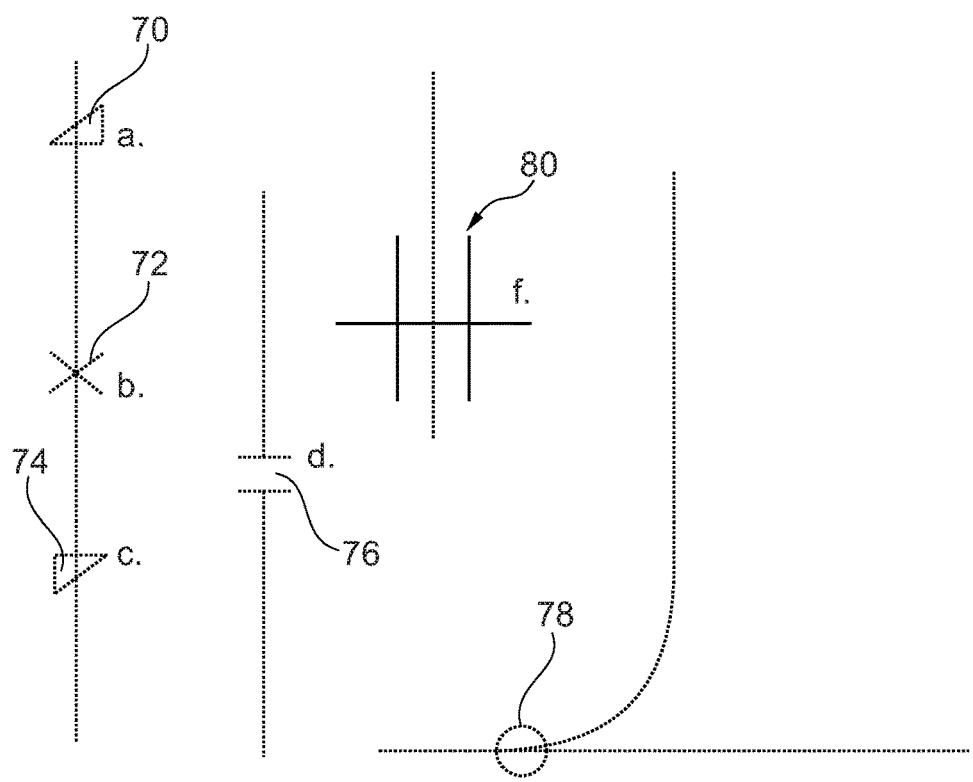
FIG. 5 shows some examples of symbols for the control of material application units.

FIG. 5 shows by way of example a plurality of symbols, with the aid of which a material application unit can be controlled. These may comprise a triangle 70, which indicates the start of a processing operation. A cross or X 72 could specify the cutting of a material track. A triangle 74 could indicate the end of a processing path. Two mutually separated transverse lines 76 extending perpendicularly to a path indicate, by way of example, the occupation of a waiting position. A branching point may be characterized by a second line and an actual branching point 78. A processing width may furthermore be indicated by a pair of inspection lines 80 extending parallel to the respective processing path. Of course, many other symbols are possible, with the aid of which the material application units 18 may be controlled individually. For implementation, it may be favourable to use symbols which can be projected from a single continuous line.

Figure 6:
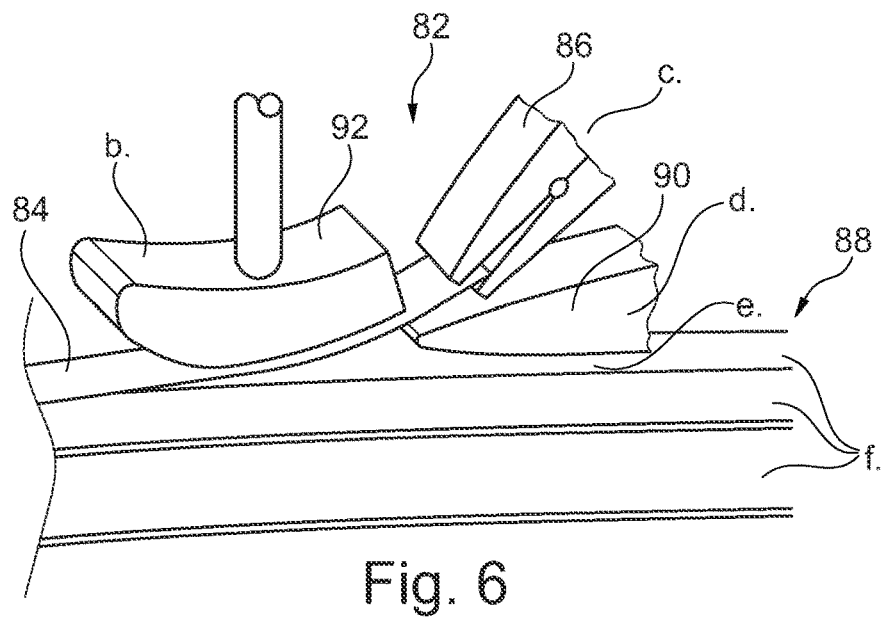
FIG. 6 shows a correcting device in a schematic representation.

As is furthermore shown in FIG. 6, the material application unit 18 may also be equipped with a correcting device 82, which can correct a defectively laid material track 84. To this end, a gripper 86 is provided, which removes the defective material track 84 from a surface 88. To this end, the gripper is assisted by a wedge 90 which, by way of example, leads by application of ultrasound to removal of the defective material track 84. In order to cool the defective material track 84, so as to reduce local adhesion, it is possible to use a cooling slide 92 which is pressed onto the material track 84. By way of example, the second optical detection device 44 may be used to establish when a material track 46 is defective and is consequently to be removed.

Figure 7:
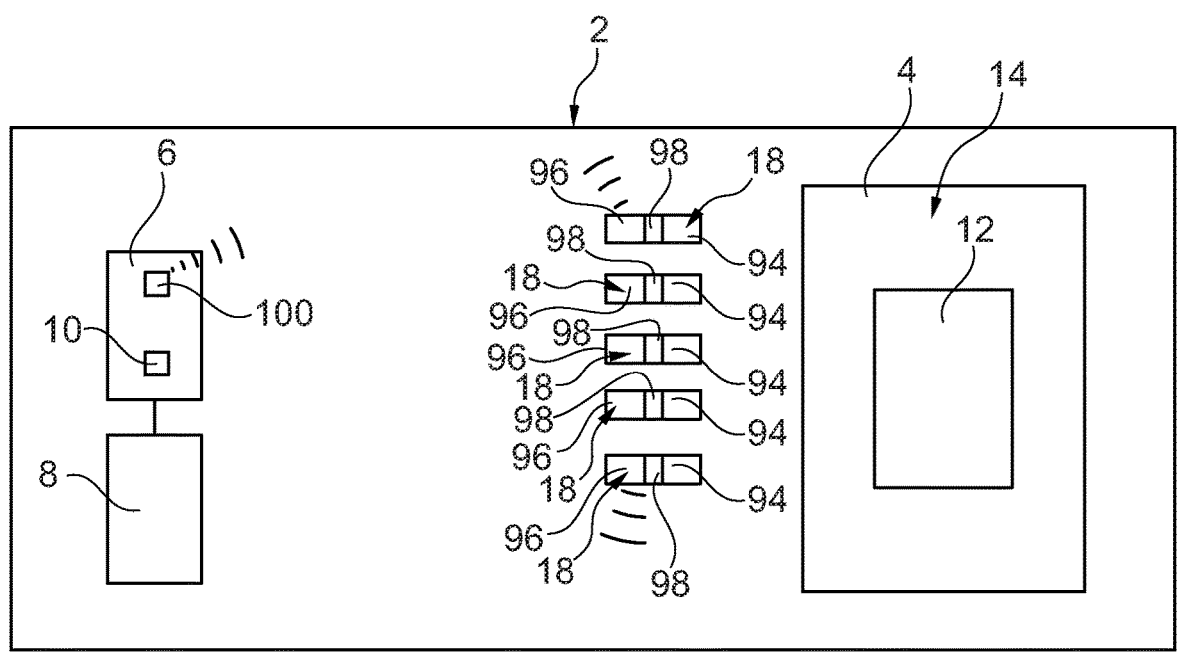
FIG. 7 shows a block-based representation of the system according to an embodiment of the invention.

FIG. 7 shows the system 2 in a block-based representation. Here, the control unit 6 together with the projection unit 10 can be seen, which is coupled to the material handling unit 8. The control unit 6 is configured in order to control the material application units 18 by specifying a plurality of individual paths, so that the material application units follow the individual paths, as shown by way of example in FIG. 1. The control unit 6 is therefore configured in order to produce at least one layer of fibre plies on the processing surface 12 on the moulding tool 4 by controlling the material application units 18. By controlling the material application units 18, the control unit 6 is configured in order to control the projection unit 10 so that it projects the predetermined paths onto the moulding tool 4 by means of the laser beam 24 or similar means.

As is indicated schematically, the material application units 18 respectively comprise a path control unit 94, which is configured in order to control the respective drive device 33 so that it follows a predetermined path. To this end, it is coupled to the optical detection device(s). The path control unit 94 may be configured in the form of an algorithm which is integrated into the control unit 6. As an alternative thereto, the path control unit 94 may also be produced in the form of an independent controller.

Furthermore, the material application units 18 respectively comprise a battery 96, which is coupled to the control unit 6, the path control unit 94 and the electrical drive device 33. The battery 96 may furthermore be mounted replaceably on the material application unit 18. In the event of critical capacity, automatic replacement may take place at the material handling unit 8.

In this example, the material application units 18 respectively comprise a first communication device 98. The latter is connectable to a second communication device 100, which is arranged in the control unit 6. In this way, communication may be carried out separately between the control unit 6 and the material application units 18, while the control of the movement of the material application units 18 is carried out by means of the optical projection. The communication devices 98 and 100 may, for instance, be based on the use of radio signals and be used in order to transmit general control instructions and to transmit status information. The material application units 18 may, for instance, report when the capacity of their battery 96 is drained or when the material store 38 is empty. The individual control units 6 may then be instructed to move the material application unit 18 in question to the material handling unit 8, in order to replace the battery 96 or the material store 38 there.

Figure 8:
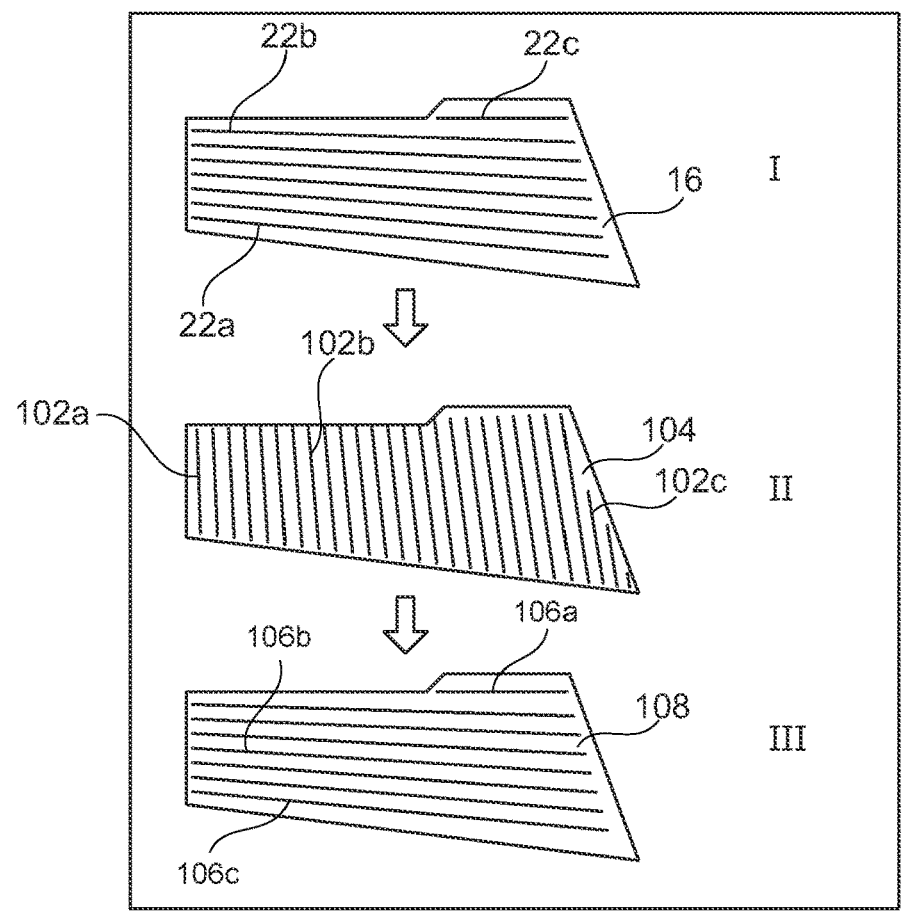
FIG. 8 lastly shows a possible sequence of steps for the laying of fibre material.

Lastly, FIG. 8 shows in three partial views I, II and III a very exemplary sequence of predetermined paths 22a, 22b, 22c, 102a, 120b, 102c, and 106a, 106b, and 106c, which are to be specified by the control unit 6 to the individual material application units 18 in order to produce the first fibre ply 16, a second fibre ply 104 and a third fibre ply 108. Of course, other paths may also be envisaged, which vary according to the configuration of the component to be produced and different local and global thicknesses.

In addition, it is to be pointed out that "comprising" does not exclude any other elements or steps, and "a" or "one" does not exclude a plurality. Furthermore, it is to be pointed out that the features which have been described with reference to one of the exemplary embodiments above may also be used in combination with other features of other exemplary embodiments described above. Reference signs in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 system for producing a component
4 moulding tool
6 control unit
8 material handling unit
10 projection unit
12 processing surface
14 edge surface
16 first fibre ply
18 material application unit
20 first group of material application units
22 predetermined path (22a, 22b, 22c)
24 laser beam
26 chassis
28 front side of the chassis
30 rear side of the chassis
32 front wheel
33 drive device
34 rear wheel
36 holder
38 material store
40 material delivery apparatus
42 first optical detection device
44 second optical detection device
46 laid material track
48 first spool
50 material carrier tape
52 fibre material
54 first cog wheel
56 pinion
58 second spool
60 housing
62 circumferential line
64 branch line
66 end line
68 predetermined path (68a, 68b, . . . , 68f)
70 triangle as control instruction
72 cross as control instruction
74 triangle as control instruction
76 transverse line as control instruction
78 branching point as control instruction
80 inspection lines as control instruction
82 correction device
84 defectively laid material track
86 gripper
88 surface
90 wedge 92 cooling slide
94 path control unit
96 battery
98 first communication device
100 second communication device
102 predetermined path
104 second fibre ply
106 predetermined path
108 third fibre ply

The invention claimed is:

1. A system for producing a component from a fibre composite material, comprising:
   a moulding tool;
   a control unit comprising an optical projection unit; and
   a plurality of mutually independent material application units,
   wherein each of the plurality of material application units comprises a material store for providing fibres, a material delivery apparatus for delivering fibres from the material store and a drive device, and is configured, with the aid of the drive device, to follow a predetermined path on the moulding tool, while delivering fibres as required,
   wherein the control unit is configured to control the plurality of material application units by specifying the plurality of individual predetermined paths, wherein the optical projection unit is configured to project predetermined paths optically onto the moulding tool,
   wherein the control unit is configured to produce at least one layer of fibre plies on the moulding tool by controlling the plurality of material application units, and
   wherein the plurality of material application units is configured to respectively follow the corresponding predetermined path.

2. The system according to claim 1, wherein the optical projection unit is configured to project the predetermined paths onto the moulding tool by a laser beam.

3. The system according to claim 1, wherein each of the plurality of the material application units comprises a battery, configured to be coupled to the drive device, and a path control unit, the path control unit being configured to control the drive device so that the corresponding one of the plurality of material application units follows the corresponding predetermined path.

4. The system according to claim 3,
   wherein each of the plurality of material application units comprises a first communication device,
   wherein the control unit comprises a second communication device, and
   wherein the plurality of material application units is configured to send status data to the control unit via the first communication device and the second communication device.

5. The system according to claim 4, wherein the control unit is configured to send control instructions to the plurality of material application units via the first communication device and the second communication device.

6. The system according to claim 1, wherein the material store comprises at least one spool for delivering fibre material.

7. The system according to claim 6,
   wherein the at least one spool comprises a first spool and a second spool,
   wherein the first spool comprises a material carrier tape having a fibre material arranged thereon,
   wherein the material carrier tape is configured to be delivered from the first spool and received by the second spool, and
   wherein the material carrier tape is configured to run over a deviating apparatus as the material delivery apparatus and to be brought into contact with the moulding tool or a fibre ply located thereon.

8. The system according to claim 1,
   wherein the material store is arranged replaceably on the material application unit, and
   wherein the control unit is coupled to a material handling unit, configured to replace the material store of at least one of the plurality of material application units when required.

9. The system according to claim 1, wherein the control unit is configured to restrict a projection of the predetermined paths respectively to a limited extent around one of the plurality of material application units associated therewith.

10. The system according to claim 1,
    wherein each of the plurality of the material application units comprises a battery, configured to be coupled to the drive device, and a path control unit, the path control unit being configured to control the drive device so that the corresponding one of the plurality of material application units follows the corresponding predetermined path, and
    wherein each of the plurality of material application units comprises at least one optical detection device, respectively coupled to the associated path control unit, the path control unit being configured to follow an optical projection, detected by the detection device, of the corresponding predetermined path.

11. The system according to claim 10,
    wherein the control unit is configured to project a plurality of optical symbols onto the moulding tool, and
    wherein the path control unit of the corresponding one of the plurality of material application units is configured to recognize optical symbols detected by the detection device and to carry out control instructions assigned thereto.

12. The system according to claim 8, wherein the material handling unit is configured to fill a material store with fibre material.

13. The system according to claim 1,
    wherein the moulding tool comprises a processing surface and an edge surface surrounding the processing surface, and
    wherein the edge surface is dimensioned in such a way that the plurality of material application units stand next to one another on the edge surface and passing of further material application units is possible only on the edge surface.

14. The system according to claim 1, further comprising a correcting device, configured to remove a defective material track from the moulding tool or a fibre ply located thereon.

* * * * *